Aug. 26, 1969    F. DOLLIE    3,463,214
TIRE CHAIN LINKS
Filed Aug. 11, 1967
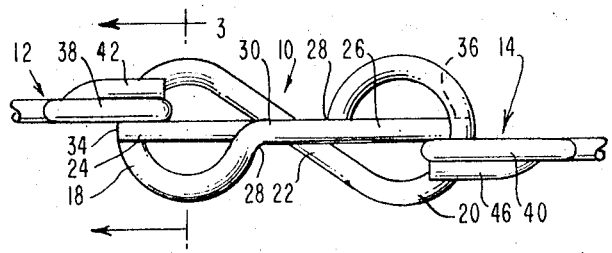
FIG. 1
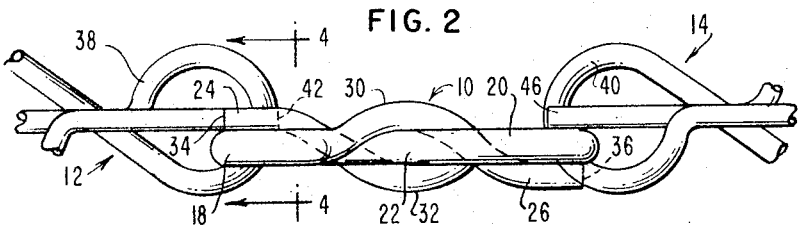
FIG. 2
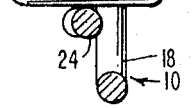
FIG. 3
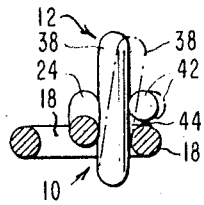
FIG. 4
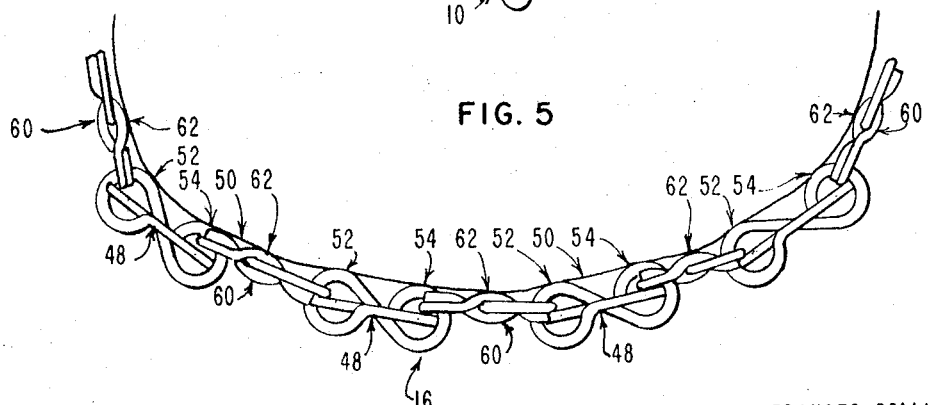
FIG. 5
FRANCES DOLLIE
INVENTOR.
ATTORNEY

United States Patent Office 3,463,214
Patented Aug. 26, 1969

3,463,214
TIRE CHAIN LINKS
Frances Dollie, 530 W. 159th St.,
New York, N.Y. 10032
Filed Aug. 11, 1967, Ser. No. 660,889
Int. Cl. B60c 27/20, 27/06; F16g 13/08
U.S. Cl. 152—243                                    3 Claims

ABSTRACT OF THE DISCLOSURE

A link for the cross member of a tire chain, comprising a unitary rod member bent to form a pair of substantially circular, oppositely-facing loop portions having diagonally opposed ends interconnected with one another; the other end of each circular loop having a straight extension overlying said interconnecting rod section, and extending substantially diametrically across the opposed circular loop with its end overlapping the same on the side opposite to the side on which it overlies the connecting portion; the two extensions overlying opposite sides of said connecting portion.

---

This invention relates to chain links and deals particularly with a type of link used in the construction of anti-skid tire chain cross members which normally extend transversely of a tire.

This present invention has for its primary object the provision of a new and improved link having novel characteristics when utilized in cross chain members of anti-skid chains used on vehicles and provide large and protruding portions of the links to serve as road engaging surfaces.

Another feature of this invention lies in the provision of links forming chain cross members which are interconnected so that adjacent links are disposed at right angles to each other and so that portions of all connected links provide tire engaging surfaces in the same plane and so that portions of every other link provide ground engaging surfaces which are substantially at right angles to the adjacent links and which extend from a tire toward the ground at substantially a right angle. This feature provides a more positive gripping action inasmuch as the links forming the chain cross members engage the ground transversely of the direction in which the vehicle is moving and at substantially right angles in relation to the ground.

These and other objects and features will appear from the following specification taken in connection with the drawings wherein:

FIGURE 1 is a plan view of a link showing portions of similar connected links.

FIGURE 2 is an edge elevation of the link shown in FIGURE 1 and showing fragments of similar connected links.

FIGURE 3 is a transverse sectional view of the link taken substantially on line 3—3 of FIGURE 1.

FIGURE 4 is a transverse sectional view of the link taken substantially on line 4—4 of FIGURE 2.

FIGURE 5 is an elevational view of a portion of the tire cross chain.

While one embodiment of the invention is illustrated in the above-referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

Referring to the drawings, the numeral 10 is employed in reference to a link in general, the numeral 12 to one connected link and the numeral 14 to an additional connected link. The links 10, 12, and 14 are identical in construction but when connected in the prescribed manner form an anti-skid cross member designated by the numeral 16.

It will be understood that any number of links may be employed depending upon the size of the tire and that any number of chain cross members may be employed in the formation of anti-skid chains.

Each link is comprised of a pair of oppositely disposed loops 18 and 20 which are generally circular in plan. They are connected to each other by a cross bar member 22 which forms a configuration having the general shape of a letter S. Each loop is provided with an extended portion 24 or 26 which is bent as at 28 to extend towards the opposite loop. As is best seen in FIGURES 1 and 2, the portions 24 and 26 are bent as at 30 and 32 to partially encircle the cross bar member 22 and to intersect the member 22 at an oblique angle. The free end 34 of the portion 24 is inserted through the loop 18 and is secured to the surface thereof. The free end 36 of the portion 26 is inserted through the loop 20 and is secured to the surface in like manner.

As best seen in FIGURE 2, the loops 18 and 20 and their connecting bar 22 lie in the same plane. The extended portions 24 and 26 are disposed on opposite sides of the loops 18 and the bent portion 30 of the extended portion 26 and the extremity of the extended portion 24 lie in a common plane parallel with the first mentioned plane. Likewise, the bent portion 32 and the extremity of the extended portion 26 lie in a common plane and parallel to the first and second mentioned planes.

It will be noted that the links are connected to each other by interlacing the loops of the links in each other. The loop 38 of the link 12 is inserted through the loop 18 and the loop 40 of the link 14 is inserted through the loop 20 of the link 10. Furthermore, the loops 38 and 40 are disposed on opposite sides of the extended portions 24 and 26 of the link 10. The end 42 of the link 12 engages the loop 18 as at 44 and the end 46 of the link 14 engages the loop 20 in a similar manner.

This method of connecting the links will insure that one link will be retained at substatnially a right angle to the adjoining link. The link may flex or turn somewhat as shown by the broken lines in FIGURE 4 but it is negligible from the standpoint of reducing the gripping effectiveness of the link.

As is more clearly illustrated in FIGURE 5, a series of links are shown in the formation of one chain cross bar member 16 which normally transgresses a tire transversely thereof and transversely of the direction in which the wheel engages the ground. In order to simplify the description the cross chain shown in FIGURE 5 is shown as being made up of alternate links 48 and 60, being understood that these links are identical to each other and to the links 10, 12 and 14 previously described.

The links 48 are disposed at substantially a right angle in relation to the tire surface 50 with portions 52 and 54 contacting the tire surface and the portions 56 and 58 engaging the ground surface as is shown in FIGURE 5. The adjoining links 60 connected to the links 48 in the prescribed manner contact the tire surface at the best portions or at points 62. It will be noted that the points 62 and the portions 52 and 54 lie in substantially the same plane and that they contact the tire surface equally. Occasionally they may become embedded in portions of the tire tread but not to the extent of hampering the gripping effectiveness of the portions 56 and 58 of the links 48.

Due to the disposition of the extended portions and the manner in which they engage the loops of the adjoining links, the right angle relation between one link and an adjoining link is retained which insures that the angle at which the links 48 strike and grip the road or ground surface will be uniform and assured.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnecessary.

Changes in shape, size, and arrangement of details and parts such as come within the purview of the invention claimed may be resorted to in actual practice, if desired.

I claim:

1. A cross-member for a tire chain formed of a series of links, each comprising a pair of generally circular loops, a cross bar member connecting said loops forming an S configuration, extended portions on the end of each of said loops bent to extend towards the opposite said loop and bent to intersect opposite sides of said cross bar member obliquely, free ends on said extended portions being inserted through said loops to engage opposite sides of said loops, said links being connected to each other by having a loop of one link inserted through the loop of the next adjacent link and disposed on one side of said free end which is positioned therethrough the opposite adjacent link similarly connected to said loop of one said link on the opposite side of said free end projecting therethrough, said loops of said adjacent links being disposed at substantially a right angle to said loop of said one link, whereby a tire chain cross member is formed of a series of interconnected links having one link disposed at a right angle to relation to the adjacent connected link and whereby the loops of one link, the said intersecting portion of the adjacent link lie in substantially the same plane providing tire-engaging surfaces, the opposite sides of the loops of the same links providing ground-engaging surfaces, said chain cross member being disposed transversely to the direction of movement of the wheel.

2. A link for a tire chain comprising first and second generally circular loops when viewed in plan, each loop having open ends lying adjacent each other, a diagonally extending cross bar member lying in the plane of said loops and tangentially connecting the end of the first loop lying at one side of the link to that end of the second loop at the other side of the link, the other end of said first loop having an extended portion that is straight when viewed in plan but which curves downwardly beneath said cross bar and then upwardly through said second loop onto the upper side of said second loop at a locus substantially intersecting the most remote arcuate portion of said second loop, and the other end of said second loop having an extended portion that is also straight when viewed in plan but which curves upwardly over said cross bar and then downwardly through the first loop onto the bottom side of said first loop at a locus substantially intersecting the most remote arcuate portion of said first loop.

3. A link for a tire chain including a pair of generally circular loops, a cross bar connecting said loops forming an S configuration, the loops and cross bar being on substantially a common plane, extended portions on the end of each said loop, said extended portions being in a plane intersecting said common plane at substantially right angles, the extension on one of said loops being bent to cross one side of said cross bar, being bent to pass through the other loop, and intersecting the other loop to the end most remote from said one loop, the extension on the other said loop being bent to cross the other side of said cross bar, being bent to pass through said one loop, and intersecting said one loop at the end most remote from said other loop.

References Cited

UNITED STATES PATENTS

| 1,000,710 | 8/1911 | Bryant | 152—243 |
| 1,296,069 | 3/1919 | Gahring | 152—243 |
| 2,110,474 | 3/1938 | Reyburn | 152—245 |

ARTHUR L. LA POINT, Primary Examiner

U.S. Cl. X.R.

59—92